(12) United States Patent
Enoki et al.

(10) Patent No.: US 11,072,372 B2
(45) Date of Patent: Jul. 27, 2021

(54) VEHICLE FRONT BODY STRUCTURE

(71) Applicant: TOYOTA JIDOSHA KABUSHIKI KAISHA, Aichi-ken (JP)

(72) Inventors: Koichi Enoki, Toyota (JP); Junichi Abe, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 79 days.

(21) Appl. No.: 16/558,318

(22) Filed: Sep. 3, 2019

(65) Prior Publication Data
US 2020/0079434 A1 Mar. 12, 2020

(30) Foreign Application Priority Data

Sep. 10, 2018 (JP) .............................. JP2018-169072

(51) Int. Cl.
*B62D 25/08* (2006.01)
*B62D 21/15* (2006.01)
*B60R 19/34* (2006.01)
*B62D 21/11* (2006.01)

(52) U.S. Cl.
CPC ......... *B62D 21/152* (2013.01); *B62D 25/082* (2013.01); *B60R 19/34* (2013.01); *B62D 21/11* (2013.01); *B62D 25/085* (2013.01)

(58) Field of Classification Search
CPC .... B62D 25/08; B62D 25/082; B62D 25/085; B62D 21/152

USPC ............... 296/203.01, 203.02, 187.09, 187.1
See application file for complete search history.

(56) References Cited

U.S. PATENT DOCUMENTS

| 7,380,830 | B2* | 6/2008 | Mitsui | ................... | B60T 17/046 |
| | | | | | 180/274 |
| 7,461,890 | B2* | 12/2008 | Yatsuda | ............... | B62D 25/082 |
| | | | | | 296/203.02 |
| 9,415,806 | B2* | 8/2016 | Miyagano | ............ | B62D 25/082 |
| 2016/0176442 | A1 | 6/2016 | Miyagano et al. | | |

FOREIGN PATENT DOCUMENTS

| JP | 2016-117433 A | 6/2016 |
| JP | 2017-88127 A | 5/2017 |

* cited by examiner

*Primary Examiner* — Dennis H Pedder
(74) *Attorney, Agent, or Firm* — Hauptman Ham, LLP

(57) ABSTRACT

A front side member includes, at a front portion, a front section in which an upper flange joint protrudes outward in a lateral direction of the vehicle. A reinforcing plate is overlapped with and welded to a laterally-outward side surface of the front section. The reinforcing plate includes a flange that is overlapped with and welded to the upper flange joint of the front side member. A rear end of the reinforcing plate extends to the same position as a rear end of the front section or further rearward. The reinforcing plate reduces deformation of the front section and the upper flange joint, inhibiting collapse of the closed cross sectional structure of the front side member.

3 Claims, 5 Drawing Sheets

US 11,072,372 B2

VEHICLE FRONT BODY STRUCTURE

CROSS REFERENCE TO RELATED APPLICATION

This application claims priority to Japanese Patent Application No. 2018-169072 filed on Sep. 10, 2018, which is incorporated herein by reference in its entirety including the specification, claims, drawings, and abstract.

TECHNICAL FIELD

The present disclosure relates to a vehicle front body structure, in particular to a reinforcement of front side members.

BACKGROUND

A front body structure that is a portion of a vehicle positioned in front of a passenger compartment includes a pair of front side members extending in a longitudinal direction of the vehicle on the right and left sides of the front body structure. The front side member receives a collision force from the front in the event of a front collision and absorbs a collision energy by being deformed.

JP 2016-117433A describes a front side member (12) and a gusset (40) positioned on a laterally outer side of the front side member (12). The front side member (12) has a closed cross sectional structure in which a front side member outer portion (38) on a laterally outer side and a front side member inner portion (39) on a laterally inner side are joined. The gusset (40) transmits, to the front side member (12), a collision force received at an end portion of a front bumper reinforcement (16) in a small overlap collision. It should be noted that the above reference numerals in parentheses are reference numerals used in JP 2016-117433A. These reference numerals do not relate to any of the reference numerals for the embodiments according to the present application.

In the event of a front collision, a front side member absorbs a collision energy by being bent by a collision force. If a joint between a laterally-outer member and a laterally-inner member that together form a closed cross sectional structure is uncoupled, the closed cross section is collapsed. In such a case, because of not enough strength, the front side member may not be deformed as expected in the collision, such that the amount of absorption of the collision energy cannot reach an expected level.

SUMMARY

The present disclosure inhibits a closed cross sectional structure of a front side member from being collapsed in the event of a front collision.

A vehicle front body structure according to an embodiment of the present disclosure includes a pair of font side members disposed at a front portion of a vehicle respectively on the right and left. The front side members extend in a longitudinal direction of the vehicle. Each of the front side members has a closed cross sectional structure in which an outer member and an inner member positioned on a laterally inner side of the outer member are joined together. The vehicle front body structure further includes a reinforcing plate that is disposed to overlap a portion of a laterally-outer side surface of the front side member. In each of the front side members, there is formed a flange joint at which a flange of the outer member and a flange of the inner member are joined together at a laterally-outer upper or lower edge.

Each of the front side member includes a front section in which the flange joint protrudes in a lateral direction of the vehicle and a rear section in which the flange joint protrudes in a vertical direction of the vehicle. The reinforcing plate overlaps at least a part of a laterally-outer side surface of the closed cross sectional structure of the front section and at least a part of the flange joint of the front section. At least a portion of a rear end of the reinforcing plate in proximity to the flange joint extends to the same position as a rear end of the front section, or further rearward than the rear end of the front section.

Reinforcement for the flange joints of the front side member and adjacent areas can inhibit the flange joints from being opened and thereby inhibit the cross sectional structure from being collapsed when the front side member is bent in the event of a front collision.

The front side member may include a transition section between the front section and the rear section. In the transition section, the orientation of the flange joint may change from the lateral direction of the vehicle to the vertical direction of the vehicle between the rear end of the front section and a front end of the rear section. The portion of the rear end of the reinforcing plate in proximity to the flange joint may be in the transition section.

By using the reinforcing plate to inhibit collapse of the cross sectional structure of the front side member, deformation of the front side member occurs within an expected manner.

BRIEF DESCRIPTION OF DRAWINGS

Embodiment(s) of the present disclosure will be described by reference to the following figures, wherein.

DESCRIPTION OF EMBODIMENTS

Embodiments of the present disclosure are described below with reference to the drawings. In the description below, the terms describing relative positions and orientations such as front, forward, rear, rearward, left, leftward, right, rightward, up, upward, down, and downward respectively refer to directions and positions of the vehicle. The front-rear direction, the right-left direction, and up-down direction of the vehicle are respectively described as a longitudinal direction, a lateral direction, and a vertical direction. Along the lateral (width) direction of the vehicle, a laterally internal side and laterally inwards respectively refer to a side in proximity to and a direction towards the longitudinally extending centerline of the vehicle, while a laterally outer side and laterally outward respectively refer to a side remote from and a direction opposite to the centerline. In each drawing, the arrows FR, UP, LH, and OUT respectively indicate the front, up, left, and lateral outward directions of the vehicle.

Figure 1:
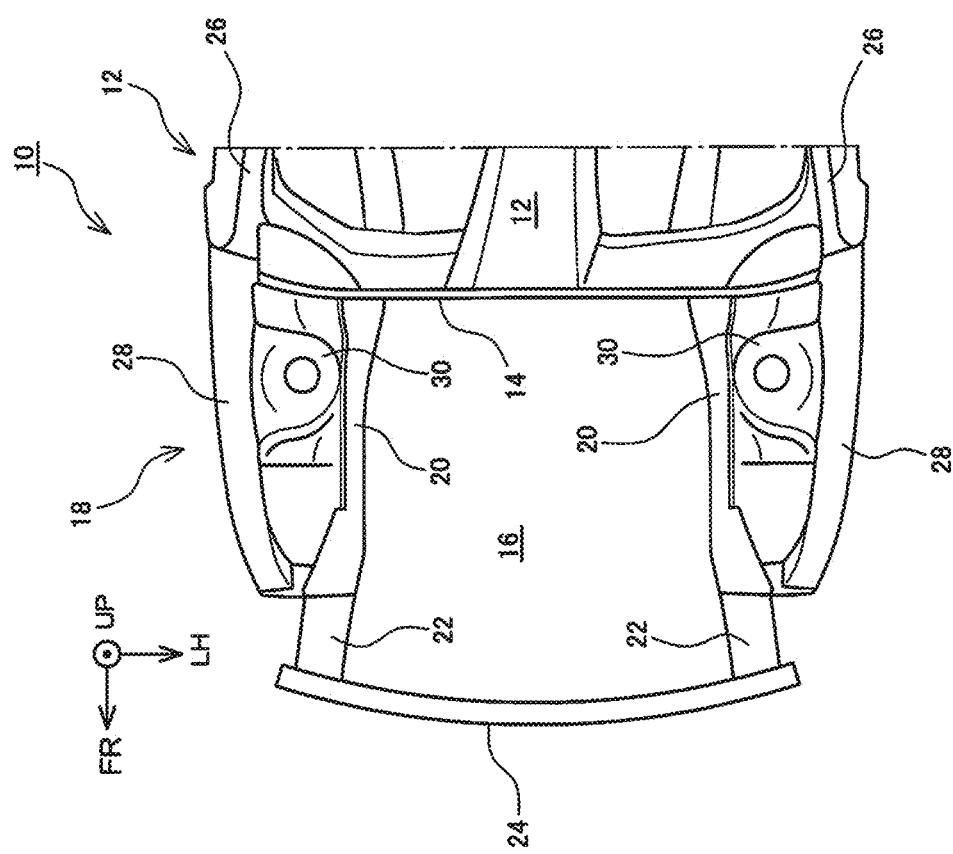
FIG. 1 is a plan view schematically showing main parts of a vehicle front body structure.
Figure 2:
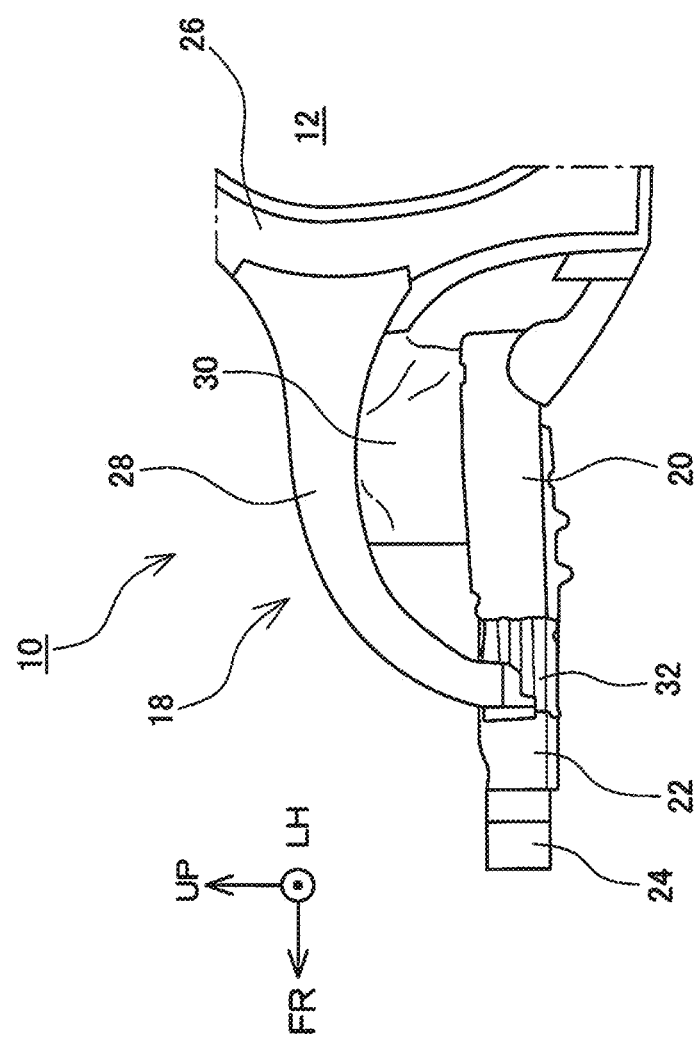
FIG. 2 is a side view schematically showing the main parts of the vehicle front body structure.

FIGS. 1 and 2 schematically show the front of a vehicle 10. FIG. 1 is a plan view; and FIG. 2 is a side view. In general, a vehicle, such as an automobile, includes an engine compartment 16 that is disposed in front of a passenger compartment 12 and partitioned with a dash panel 14. The engine compartment 16 is a space in which a power source, such as an internal combustion engine, is disposed. The structure that forms the engine compartment 16 is referred to as a front body structure 18. When the power source is disposed at a portion other than the front, such as at a rear of the vehicle, the front body structure 18 may include a luggage compartment. The front body structure 18 includes a pair of front side members 20 extending in the longitudinal direction respectively on the right and left sides of the vehicle front portion. The pair of front side members 20 extend forward from the dash panel 14. A bumper reinforcement 24 bridges the front ends of the front side members 20 via crash boxes 22. The crash boxes 22 absorb a collision energy by being deformed in the event of a front collision. Front upper members 28 are disposed to connect the front ends of the front side members 20 and front pillars 26. As shown in the side view in FIG. 2, each of the front upper members 28 has an arch shape along an upper edge of a wheel well. As shown in the plan view in FIG. 1, the front upper members 28 are disposed on laterally outer sides to the front side members 20. A suspension tower 30 is disposed between the front side member 20 and the front upper member 28 on each side of the vehicle.

A reinforcing plate 32 is provided to overlap at least a part of a laterally outer side surface of a front portion of each front side member 20. The reinforcing plate 32 is attached to the front side member 20 to enhance the rigidity and strength of the attached portion. For example, in a small overlap collision, the reinforcing plate 32 contributes to efficiently transmit a collision force applied to an end portion of the bumper reinforcement 24 to a laterally-outer side surface of the front side member 20.

Figure 3:
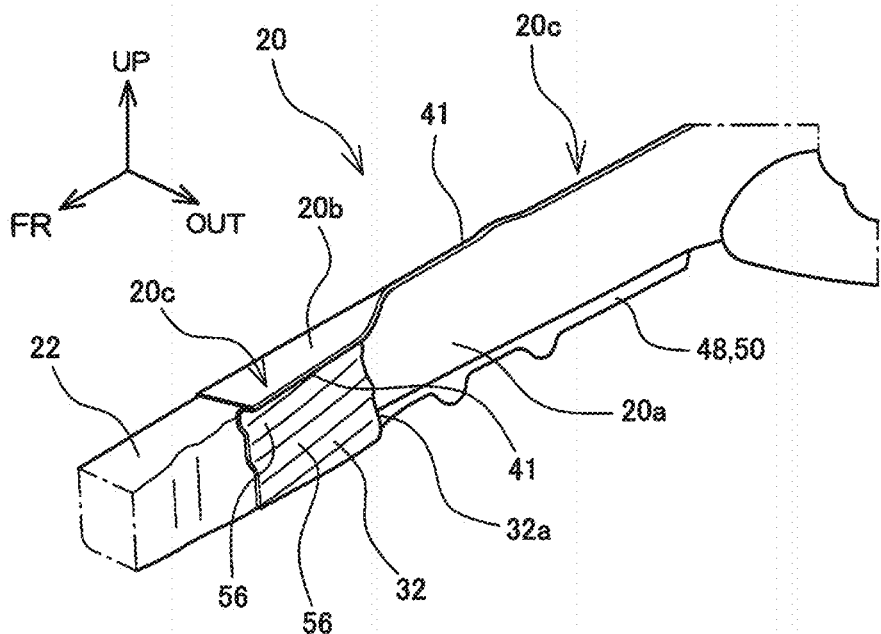
FIG. 3 is a perspective view showing a structure of a front side member and adjacent members.
Figure 4:
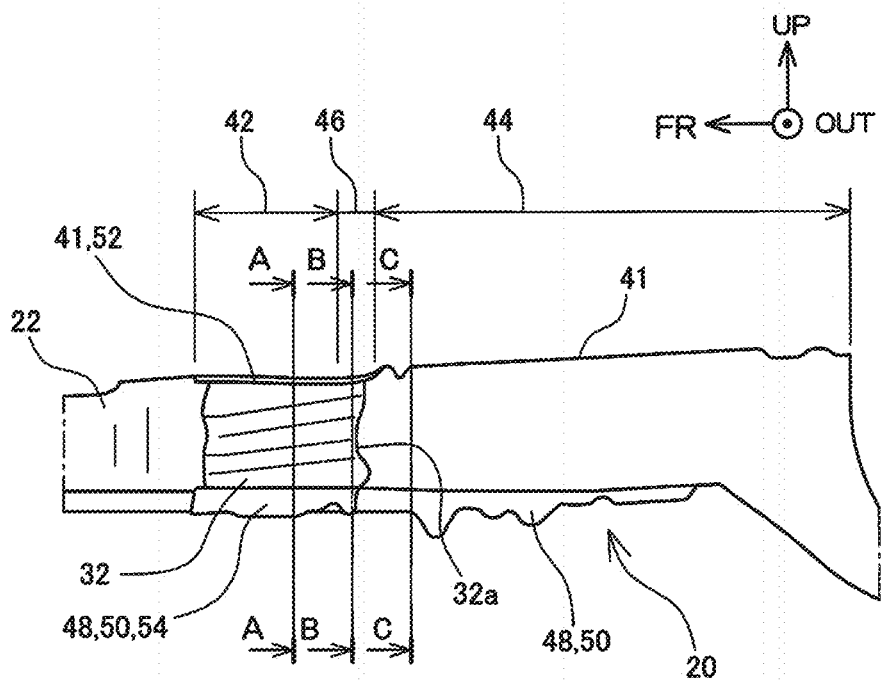
FIG. 4 is a side view showing the structure of the front side member and adjacent members.
Figure 5:
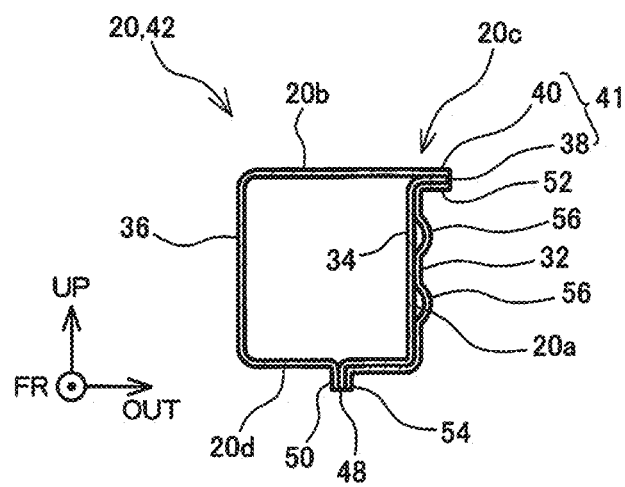
FIG. 5 is a cross sectional view of a front section of the front side member.
Figure 6:
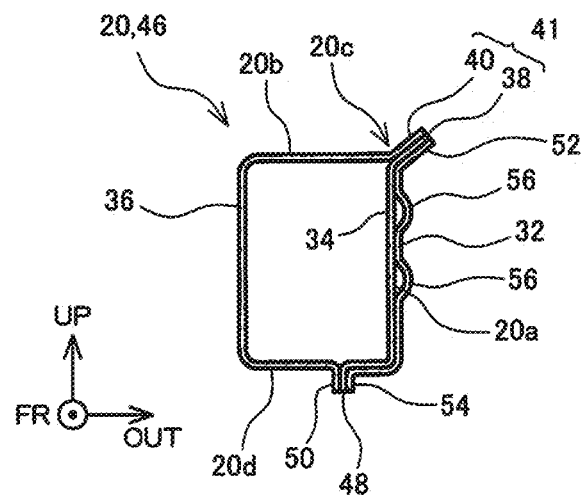
FIG. 6 is a cross sectional view of a transition section of the front side member.
Figure 7:
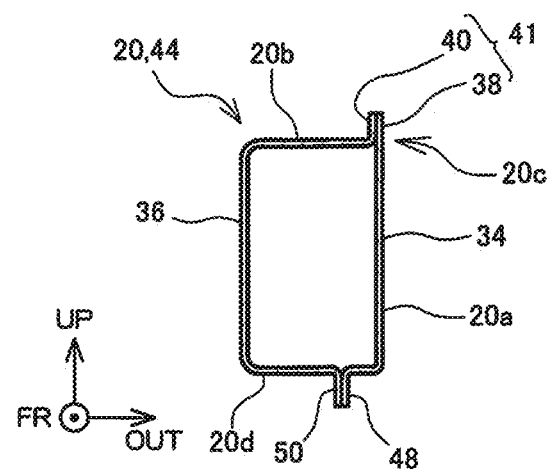
FIG. 7 is a cross sectional view of a rear section of the front side member.

FIGS. 3 and 4 show the left front side member 20 with adjacent members. FIG. 3 is a perspective view; and FIG. 4 is a side view. The right front side member 20 is symmetric to the left front side member 20. FIG. 5 is a cross sectional view taken along line A-A in FIG. 4; FIG. 6 is a cross sectional view taken along line B-B in FIG. 4; and FIG. 7 is a cross sectional view taken along line C-C in FIG. 4.

The front side member 20 is an elongated member having a closed cross sectional structure. The closed cross section may have, for example, a rectangular shape. As shown in FIGS. 5 to 7, each front side member 20 includes an outer member 34 disposed on the laterally outer side and an inner member 36 disposed on the laterally inner side. The front side member 20 is formed, for example, by spot welding the outer member 34 and the inner member 36. The outer member 34 and the inner member 36 may be made of stamped or otherwise formed steel sheet. In the cross section of the front side member 20, the outer member 34, and the inner member 36 are welded together at a laterally outer upper corner and around the center on the bottom surface. A laterally-outer side surface 20a and an upper surface 20b of the closed cross sectional portion of the front side member 20 form an edge that is referred to as an outer upper edge 20c.

The outer member 34 and the inner member 36 of the front side member 20 each includes a weld flange provided along the outer upper edge 20c. The weld flange of the outer member 34 is referred to as an outer upper flange 38; and the weld flange of the inner member 36 is referred to as an inner upper flange 40. The outer upper flange 38 and the inner upper flange 40 are welded together to form an upper flange joint 41. The upper flange joint 41 protrudes from the outer upper edge 20c of the front side member 20.

As shown in FIG. 5, in the front section of the front side member 20, the upper flange joint 41 outwardly protrudes in the lateral direction of the vehicle. In contrast, as shown in FIG. 7, in the rear section of the front side member 20, the upper flange joint 41 protrudes upward in the vertical direction. In the front side member 20, the portion having the upper flange joint 41 that laterally outwardly protrudes is referred to as a front section 42. In the front side member 20, the portion having the upper flange joint 41 that upwardly protrudes is referred to as a rear section 44. As shown in FIG. 6, in a middle section between the front section 42 and the rear section 44, the upper flange joint 41 protrudes diagonally upward. The orientation of the upper flange joint 41 in this section smoothly changes from laterally outward to upward between the rear end of the front section 42 and the front end of the rear section 44. In this way, the upper flange joint 41 is continuously provided throughout the front side member 20. This middle portion of the front side member 20 between the front section 42 and the rear section 44 is referred to as a transition section 46.

Other weld flanges are provided for the outer member 34 and the inner member 36 at a portion corresponding to around the center of a bottom surface 20d of the front side member 20 (refer to FIGS. 5 to 7). The flange of the outer member 34 provided on the bottom surface 20d is referred to as an outer lower flange 48; and the flange of the inner member 36 is referred to as an inner lower flange 50. The substantially rectangular closed cross sectional structure of the front side member 20 is formed by welding the outer upper flange 38 and the inner upper flange 40, and also the outer lower flange 48 and the inner lower flange 50.

In the front section 42, because the upper flange joint 41 is provided in the plane defined by the longitudinal direction and the horizontal direction (hereinafter referred to as a horizontal plane), the upper flange joint 41 contributes to enhance the rigidity and the strength of the front side member 20 against a bend in the horizontal plane. In the rear section 44, the upper flange joint 41 is positioned next to a steel sheet of the suspension tower 30 and welded together.

In the front section 42, the reinforcing plate 32 is positioned to be overlapped with and welded to the laterally-outer side surface 20a of the front side member 20. The reinforcing plate 32 includes a reinforcing plate upper flange 52 that is overlapped with the outer upper flange 38 and the inner upper flange 40. These three upper flanges 38, 40, and 52 may be overlapped and welded all together at one time. The reinforcing plate 32 also includes a reinforcing plate lower flange 54 that is overlapped with the outer lower flange 48 and the inner lower flange 50. These lower flanges 48, 50, and 54 may also be overlapped and welded all together at one time.

The reinforcing plate 32 extends from the front end of the front side member 20 at least to the rear end of the front section 42. The reinforcing plate 32 may extend further rearward than the rear end of the front section 42 so that a rear end 32a of the reinforcing plate 32 is positioned within the transition section 46. Similarly, the reinforcing plate upper flange 52 and the reinforcing plate lower flange 54 may extend at least to the rear end of the front section 42, or further rearward into the transition section 46.

The reinforcing plate 32 may be welded not only to the flange portions but also to the side surface 20a of the front side member 20. The reinforcing plate 32 may include a raised-strip-shaped ridge 56 extending in the longitudinal direction. Although two ridges 56 are shown in the embodiments in the drawings, one or three or more ridges 56 may be provided.

Figure 8:
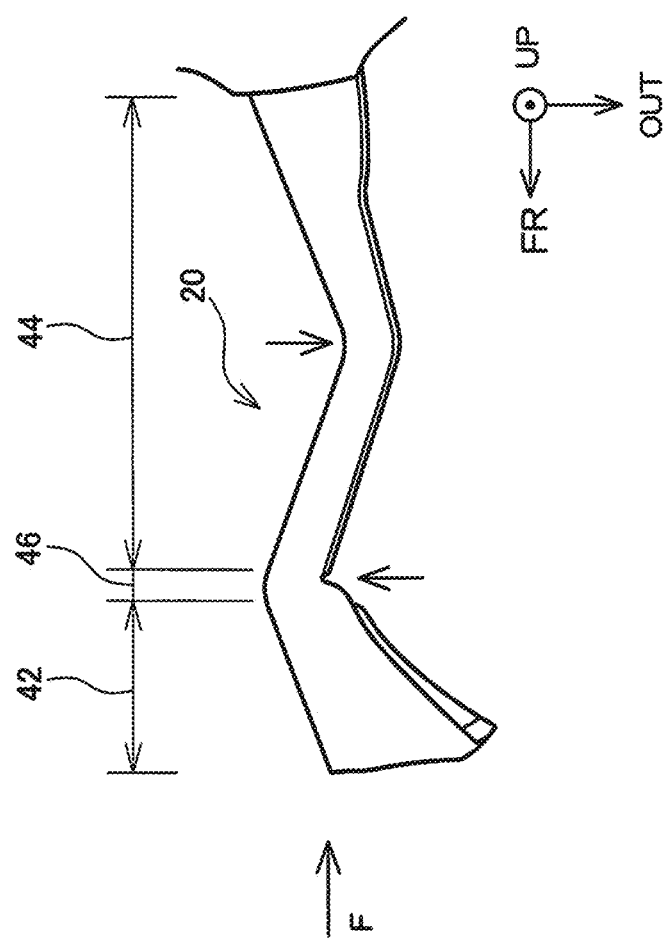
FIG. 8 is a plan view showing deformation of the front side member in the event of a front collision.

FIG. 8 is a plan view schematically showing the left front side member 20 that is deformed as expected in a front collision. When a collision force F is applied to the front side member 20 from the front, an inward bend occurs in which the front side member 20 is bent laterally inwards in or around the transition section 46. An outward bend also occurs in which the front side member 20 is bent laterally outward around the center of the rear section 44.

When the joint between the outer member 34 and the inner member 36 is broken apart such that the closed cross sectional structure is no longer maintained, the front side member 20 is not bent at the expected positions shown in FIG. 8, but is bent at unexpected positions. In the front section 42, because the outer upper flange 38 and the inner upper flange 40 (both are plate members) are disposed in a horizontal plane, these flanges 38, 40 are deformed to be separated from each other when a bending moment in the horizontal plane is induced. The joint may be separated to open the flange portions such that the closed cross sectional structure is collapsed. In case of a spot welded joint, in particular, because stress is concentrated around the welded spots, fractures may be formed around the welded spots of the members and the flange joint may be uncoupled initiated from the factures.

In order to reduce deformation, the reinforcing plate 32 is provided in the front section 42 of the front side member 20 where the flange portion is easily opened. The reinforcing plate 32 reduces deformation of the front section 42. In particular, the reinforcing plate upper flange 52 reduces deformation of the outer upper flange 38 and the inner upper flange 40 by reinforcing them. In this way, collapse of the closed cross sectional structure of the front section 42 can be inhibited so that the front side member 20 is bent within an expected manner.

In order to reduce deformation of the front section 42, it is effective to inhibit deformation of the outer upper flange 38, the inner upper flange 40, and adjacent portions. Accordingly, a portion of the reinforcing plate 32 in proximity to the outer upper edge 20c at which these flanges 38, 40 are provided extends to the rear end of the front section 42, or further rearward than the rear end into the transition section 46. In contrast, as long as the closed cross sectional structure can be maintained, a bottom portion (remote from the outer upper edge 20c) or a center portion of the reinforcing plate 32 may not extend to the rear end of the front section 42. The front end of the reinforcing plate upper flange 52 may not extend to the front end of the front section 42.

Although in the above embodiment the weld flanges 38, 40 are provided at the outer upper edge 20c of the front side member 20 in the front section 42, these weld flanges or additional weld flanges may be provided at the outer lower edge. A portion of the reinforcing plate in proximity to the weld flanges extends to the rear end of the front section 42 or further to the transition section 46.

REFERENCE SIGNS LIST 10 vehicle, 12 passenger compartment, 14 dash panel, 16 engine compartment, 18 front body structure, 20 front side member, 20c outer upper edge, 22 crash box, 24 bumper reinforcement, 26 front pillar, 28 front upper member, 30 suspension tower, 32 reinforcing plate, 32a rear end (of the reinforcing plate), 34 outer member, 36 inner member, 38 outer upper flange, 40 inner upper flange, 41 upper flange joint, 42 front section, 44 rear section, 46 transition section, 48 outer lower flange, 50 inner lower flange, 52 reinforcing plate upper flange, 54 reinforcing plate lower flange, and 56 ridge.

The invention claimed is:

1. A vehicle front body structure, comprising:
a pair of front side members respectively disposed at right and left front portions of a vehicle, the pair of front side members extending in a longitudinal direction of the vehicle, each of the front side members having a closed cross sectional structure in which an outer member and an inner member positioned on a laterally inner side of the outer member are joined together, wherein,
  in each of the front side members, a flange joint is formed at which a flange of the outer member and a flange of the inner member are joined together at a laterally-outer upper or lower edge, and
  each of the front side members comprises a front section in which the flange joint protrudes in a lateral direction of the vehicle outwardly away from the closed cross sectional structure, and a rear section in which the flange joint protrudes in a vertical direction of the vehicle; and
a reinforcing plate overlapping at least a part of a laterally-outer side surface of the closed cross sectional structure of the front section and at least a part of the flange joint of the front section, wherein at least a portion of a rear end of the reinforcing plate in proximity to the flange joint extends to the same position as a rear end of the front section, or further rearward than the rear end of the front section.

2. The vehicle front body structure according to claim 1, wherein
each of the front side members comprises a transition section between the front section and the rear section, and an orientation of the flange joint in the transition section changes from the lateral direction of the vehicle to the vertical direction of the vehicle between the rear end of the front section and a front end of the rear section, and
the portion of the rear end of the reinforcing plate in proximity to the flange joint is in the transition section.

3. A vehicle front body structure, comprising:
a pair of front side members respectively disposed at right and left front portions of a vehicle, the pair of front side members extending in a longitudinal direction of the vehicle, each of the front side members having a closed cross sectional structure in which an outer member and an inner member positioned on a laterally inner side of the outer member are joined together, wherein,
  in each of the front side members, a flange joint is formed at which a flange of the outer member and a flange of the inner member are joined together at a laterally-outer upper or lower edge, and
  each of the front side members comprises a front section in which the flange joint protrudes in a lateral direction of the vehicle, and a rear section in which the flange joint protrudes in a vertical direction of the vehicle; and
a reinforcing plate overlapping at least a part of a laterally-outer side surface of the closed cross sectional structure of the front section and at least a part of the flange joint of the front section, wherein at least a portion of a rear end of the reinforcing plate in proximity to the flange joint extends to the same position as a rear end of the front section, or further rearward than the rear end of the front section,
wherein the reinforcing plate is terminated at a position forward of the rear section of each of the front side members.

* * * * *